(12) United States Patent
Castellon

(10) Patent No.: US 6,555,978 B1
(45) Date of Patent: Apr. 29, 2003

(54) AUTOMOBILE ANTI-PINCHING SYSTEMS

(76) Inventor: Melchor Daumal Castellon, Diputación, 455-457, 08013 Barcelona (ES)

(*) Notice: Subject to any disclaimer, the term of this patent is extended or adjusted under 35 U.S.C. 154(b) by 0 days.

(21) Appl. No.: 09/806,044
(22) PCT Filed: Oct. 13, 2000
(86) PCT No.: PCT/ES00/00392
§ 371 (c)(1),
(2), (4) Date: Mar. 26, 2001
(87) PCT Pub. No.: WO01/29356
PCT Pub. Date: Apr. 26, 2001

(30) Foreign Application Priority Data

Oct. 22, 1999 (ES) .............................. 9902334

(51) Int. Cl.$^7$ ................................................ E05F 15/16
(52) U.S. Cl. ....................... 318/266; 318/286; 318/466
(58) Field of Search ................................ 318/264, 265, 318/266, 286, 466–469, 471; 49/26, 28, 29; 388/903, 907.5, 934; 160/1

(56) References Cited

U.S. PATENT DOCUMENTS 5,436,539 A * 7/1995 Wrenbeck et al. .......... 318/265
5,585,702 A * 12/1996 Jackson et al. ............. 318/266
5,610,484 A * 3/1997 Georgin ..................... 318/286
5,616,997 A * 4/1997 Jackson et al. ............. 318/467
5,682,090 A * 10/1997 Shigematsu et al. ........ 318/468

FOREIGN PATENT DOCUMENTS

| DE | 29510688 | 9/1996 |
| EP | 0640740 | 3/1995 |
| JP | 6-217581 | 8/1994 |
| JP | 7-67293 | 3/1995 |

* cited by examiner

Primary Examiner—Bentsu Ro
(74) Attorney, Agent, or Firm—Ostrolenk, Faber, Gerb & Soffen, LLP

(57) ABSTRACT

The system includes a motor (3) of at least eight poles, control means (1) acting on the motor (3) as a function of its turning speed or the current intensity, stopping its operation and/or reversing its turning sense, including Hall sensors (9, 10), a MOSFET (4) transistor, a relay (5), a programmable microprocessor (6), condensers in a multilayer plate, an EEPROM memory, control means for the temperature of the system, regulation means of the maximum journey of the window (11) and disconnecting means of the motor (3) when the glass (11) is at a safety distance before the lower or upper end of the run stopper, reaching the final journey by the inertia of the glass (11) or by mechanical drawing of the transmission, respectively.

11 Claims, 2 Drawing Sheets

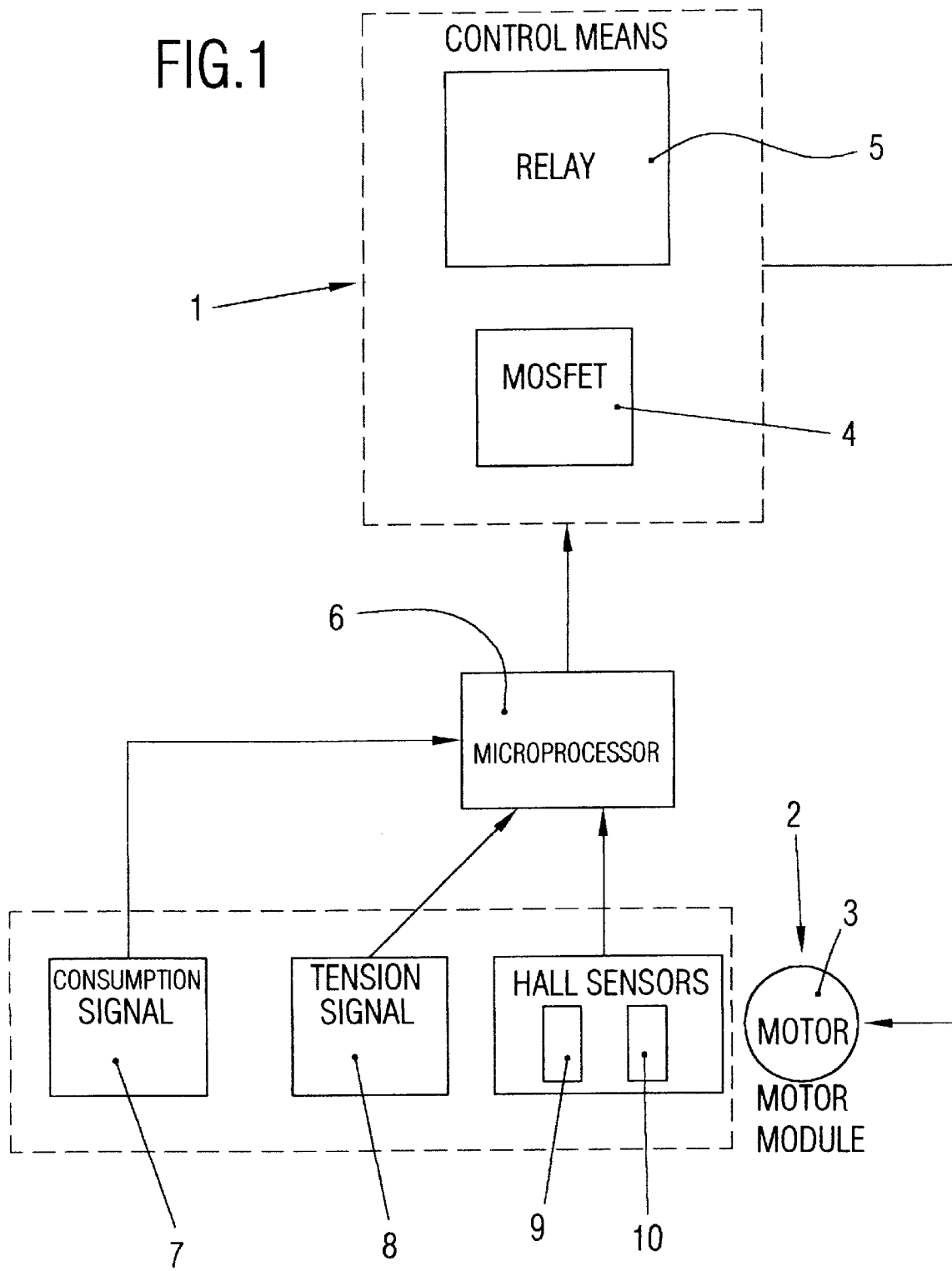

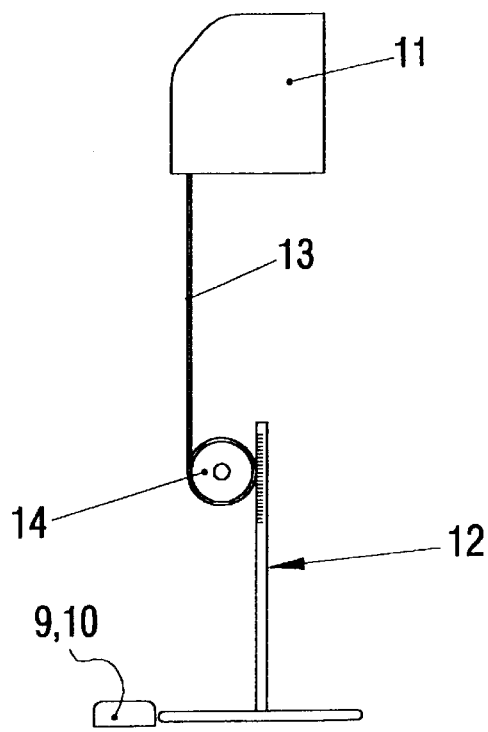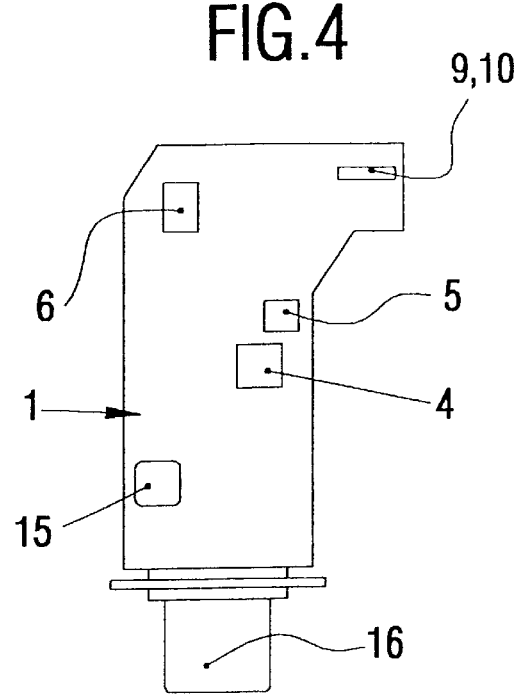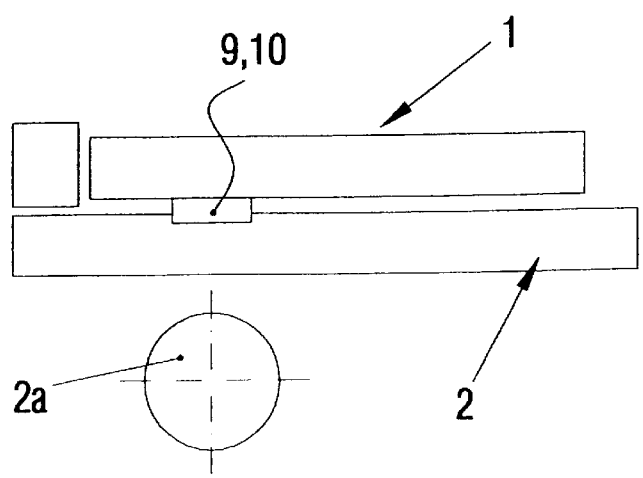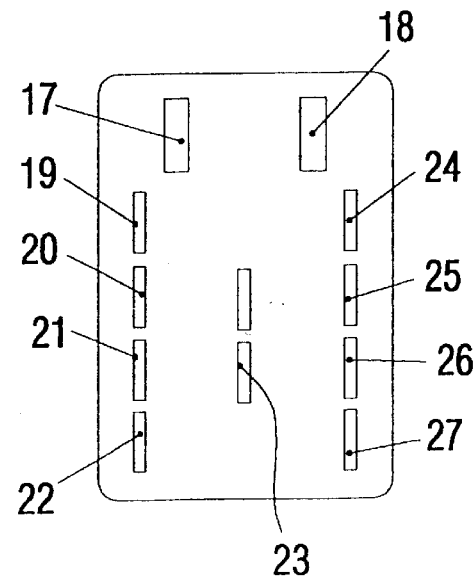

AUTOMOBILE ANTI-PINCHING SYSTEMS

The conventional systems of operating, for instance, the windows of a car or the sliding roof of a car includes tipically an electric motor that operates the pulley and the cables of the operating assembly of the glass or electric window, forcing the glass to go up or down sliding by the interior of the corresponding guides and joints installed in the door or frame of the car.

Said systems usually carry the so-called anti-pinching systems, which consist in control means that normally act on the electric motor of the operating system when there is detected any eventual blocking of the glass of the window or sliding roof of the car.

There exist anti-pinching systems, so-called direct electronic anti-pinching systems, that may be applied to electric window, sliding roof or the like devices, essentially based in mounting a coating at the interior portion of the frame of the window of a car, provided with an optical fibre conductor. When the glass raises and finds an obstacle between the upper edge of same and the window's frame, for instance, the hand of a person, the glass press the obstacle against the coating of the frame. When this happens, the flux of ligth circulating by the optical fibre conductor is modified, in such a way that a signal is sent to control means that compare same with certain pre-establibed reference values. This brings the stopping and reversion of the sense of advancement of the glass in its rise allowing the obstacle's liberation.

The object of the present invention consists in arranging improvements applicable to the indirect anti-pinching systems, i.e.; these that analize and control the operation of the motor. Said analysis is made in such a way that any change on predetermined anticipated values for predetermined situations is interpreted by the system as a possible pinching or anomaly of the normal operation of the system.

Generally speaking, an anti-pinching system according to the present invention comprises means for the control of the operation of the motor operating the window or the sliding roof of a car which are activated when detecting any variation in the normal operation of the system.

The improvements introduced in said anti-pinching system consist in that the said anti-pinching system is formed by a motor module, a reduction module and an electronic control module, being comprised said motor module by a motor with n poles. More precisely, the motor module is formed by a motor of at least eight poles. The electronic module is made up by Hall sensors intended for regulating the motor speed, sending a number of pulses for each turn of the motor. Said control means operate on said motor module either as a function of the turning speed of the motor itself or as a function of the intensity of the circulating current, stopping its operation and/or reversing the turning direction.

Said improvements offer a sure and efficient anti-pinching system, capable of satisfying the every time more stringent international standars relative to the automobile and to their user's safety, which require that the sensitivity of these systems is to be greater every day. With the improvements of the present invention these goals are achieved and, at the same time, it is possible to foresee and detect correctly any type of anomalous siuation of the system's operation.

In that sense, the improvements introduced on the indirect anti-pinching system object of the present invention provided with Hall sensors permit satisfying standards such as the american standard FMVSS118 which require a higher sensitivity of the system. The tests made in the United States with regard to such standard are made with a spring that shows a value of rigidity constant of:

$$k=65*N/mm$$

corresponding to a value 6.5 times greater that the value of the spring's constant used in Europe for the same test, which implies that in Europe there is admited a softer spring than the used for the tests of the american standard, which is satisfied, in the other hand, by the system object of the present invention.

As it has been specified above, one of the improvements introduced in the present invention is the design of the motors of at least eight poles instead of the four poles of the earlier art. The number of poles, for instance eight, is a function of the desired precision, which is determined by the following equation:

$$(x/nlec)=(d_{r0}*\pi)/(1/r*n/2)$$

where (x) is the vertical distance of the glass lecture, (nlec) the number of lectures, ($d_{r0}$) the diameter of the drum of the electric window, (r) the gear's relation and (n) the pole's number. In this way, for an electric window with a drum of $d_{r0}$=50 mm and a gear relation R=1/73, it happens that for an eight poles motor there is obtained a lectures' resolution of every 0.54 mm, instead of every 1 mm as happens in the case of the conventional electric motors of four poles. Thus, every true of the motor shaft corresponds to 4 pulses of the Hall sensor and is approximately equal to a travel of 1.6 mm of the glass. In this way, the detection of a pinching is made every 0.54 mm of travel of the glass. The Hall sensors installed are of a type at 0°, instead of the conventional systems which furnish same with 180°.

According to the invention, the electronic module of the anti-pinching system includes a circuit provided with a transistor with a field effect of insulated door, a relay, a programmable microprocesor, condensers in a multi-layer plate and an EEPROM programmable memory which is able to compensate the mechanical effects produced by the mechanical deformation of the system by storing a new value for every cycle of stoppage of the window, which actualizes the anterior run of the upper and lower stoppage value.

The transistor of field effect of insulated door or of a metal-semiconductor oxide field of n type (MOSFET) is a tension component controlled by an entry and exit impedances very high (up to $\Omega^4$). Said component includes a substrate in which are diffused two identical regions which are named source or fountain and drain, which are defined by two Ohmic contacts insulated from the substrate by diodes. The conductive way between the fountain and the source is called channel. The door is formed covering the region existing between the drain and the source with a coat of silicium dioxide over which is placed a metal plate. The tension applied determines which type n zone furnishes the electrons and is converted in the fountain whilst the other type n regiuon collects the electrons and is converted in the drain. The MOSFET works basically with a positive potential between the door and the source above named. This type of operation is named enriched operation. When the source is of the positive type, there is induced a type n channel between the source and the drain. An increase in the tension of the door increases the conductivity of the channel increasing therefore the current. In this way, the current between the drain and the source is modulated by the tension between the door and the source. The increases of the tension of the drain do not produce a proportional increase of the drain current, being same proportional to the variations of the door's tension. The electrons' flux from the fountain towards the drain is controlled by the voltage applied to the door. A positive voltage applied to the door lures the electrons towards the contact zone between the dielectric of the door and the semiconductor, which form a conduction channel between the fountain and the drain called inversion coat. The net result is that the current between the drain and the fountain is controlled by the voltage applied to the door.

A minimum requirement for the amplification of electric signs is the energy gain. It has been found that a device with tension and current gain is a very desirable circuit element. The MOSFET provides tension and current gains with an output performance towards an exterior charge exceeding the entry current and an exit tension through the exterior charge wich excels the entry tension. The tension gain of a MOSFET is caused by the fact that the current is saturated at higher tensions of the drain-fountain, in such a way that a small variation of the drain current may cause a great variation of the tension of the drain. This permits cutting away the commutation current peaks, offering a greater speed and precision of reponse to the anti-pinching system, also favouring the ammelioration of the consumption and the reduction of the parasitic currents and noises (electromagnetic emmissions). Since the motor stops before the action of the relay, the precision is higher. The invention envisages also that the electronic module of the anti-pinching system further includes a micro-controller with a mask for the programming of the application once the components are assembled. In grace to this feature, it's possible programming the application at the assembly line of the components itself. Further, there is produced a greater flexibility for updating the programs and there exists the possibility of updating the software of the application in the final assembly line, retailers, sales points, trials, etc. The access to the data of the software is very agile modifying EEPROM memory values.

The plate furnished in the new anti-pinching system allows a considerable reduction of the consumption, specially every time that the relay is activated, cutting the current peaks. In this way, at a stand-by state, which is produced when stopping the car or after 10 minutes of having disconnected the motor or else after opening the door or after operating the door locking device (closing the door without waiting time), the nominal consumption is 180 $\mu$A; whilst for an idle state (active electronics but with the motor stopped), the nominal consumption is 18 $\mu$A and, in operation, the nominal consumption is 80 $\mu$A.

It must be taken specially into account the fact that the vehicles include every day more electric and electronic components and, at the same time, there exists a need of reducing the size of the batteries regarding weight and costs. Thus, even if the consumption in itself of these systems is unimportant, it becomes so when are considered all the several types systems of electric and electronic technology that incorporates the automobile, therefore it's noticeably important said consumption reduction of the anti-pinching system of the present invention.

In the other hand, the electronic module of the anti-pinching system incorporates control means for the temperature of the system starting from the number of turns of the motor shaft during a given time taking into account the consumption of the system. When a predetermined value is exceeded, said control means of the temperature of the system allow only the raising of the window.

Advantageously, the electronic module of the anti-pinching system incorporates means for regulating the maximum travel of the window, which, when connecting the motor, are counting the number of pulses read by the Hall sensor, disconnecting said motor when certain given value is exceeded without the window arriving to the stopper.

Another of the improvements introduced in the anti-pinching system of the invention is that the electronic module incorporates disconnection means when the window is at a safety distance before the lower end of the stroke stopper, achieving the remainder of the course by the inertia of the window. In this way, it is possible performing a soft stop in a variable way as a function of two parameters which have not been considered so far by the conventional systems. Said parameters are the feeding tension, the speed of descent of the glass and the consumption of the system. There must be taken specially into account the fact that the conventional anti-pinching systems only take into account the feeding tension and the speed of descent of the glass.

The soft stop function is performed both at the upper stop position as well at the lower stop position. In the upper stop position, the motor raises the glass in such a way that the lenght of the actuating cable provokes that said glass achieves a height up to a distance before arriving to the upper stopper of the door frame. Said distance is traveled, until arriving to the upper stopper of the window's frame, in grace to springs assembled at the ends of the cable, which allow the drawing of the actuation length up to complete the travel of the window and provoking, therefore, a soft stop up to said upper stopper of the vehicle window frame. An electric window thus conceived becomes very elastic.

In this sense, when the glass reaches the upper or lower stopper of the window frame, the motor continues working until 0.5 s are elapsed. During this period of time there exists a drawing of the mechanical transmission which is variable as a funcion of the feeding tension. The drawings lecture in the upeer stopper as a function of the voltage of the battery are as follows:

For 12 V, the drawing is of 39 pulses=9.25 mm

For 14 V, the drawing is of 50 pulses=12.5 mm

For 17 V, the drawing is of 64 pulses=16 mm

This function of soft upper stop permits limiting the drawing of the mechanical transmission of the electric window noticeably improving the useful life of the mechanical elements of the system of the invention, reducing the wear and mechanical blockings. Since there is not attained a limit of mechanical drawing of said transmission, the consumption of the electric motor is reduced and, therefore, the battery is not damaged and there exist a greater stability of the electric circuit, avoiding that other devices are affected by tension falls.

In order to prevent a sudden stoppage at the lower position, the motor is disconnected, first by the MOSFET and afterwards with the relay, at a safety distance before the lower mechanical stoppage. Taking into account that the operating speed of the electric window, and therefore, the descent inertia are affected by several factors such as the feeding and consumption tension, the state of the vehicle motor (stopped or running), weter the motor is of the rigth or left side, the mechanical construction of the electri window system and the door, the environmental conditions, etc., there is made an automatic adjustment of the soft stoppage taking into account the descent speed (three different ranges), weter the vehicle is running or stopped (tension greater or lower than 13 V) and the consumption. For this fine tuning there are taken several doors in different climatic conditions and it is verified during the fatigue test.

The disconnection means of the motor take into account at least some of the factors such as the speed of descent of the window, the state working/idle of the motor and the consumption; automatically adjusting the disconnection of the motor as a function of such factors.

The protection against surcharge of the motor of the system of raising the glasses is made by means of a software. This temperature control software of the anti-pinching system is active even if the electric window is not yet initialized. The operating time of the electric window is accumulated and when it exceeds a estabilished limit value there is only allowed raising the window up to the upper stoppage. The rest time until a new operation is permitted is aproximately five times the operating time elapsed. This value is obtained in a exprimental way as per specifications at different temperatures of the standards in force and depending on the motor type.

In the practice and under normal working conditions, there should be possible 20 complete cycles of raising-lowering of the glass without a disconnection of the system. In any case, the protection for overheating must allow the raising of the glass up to the upper stoppage. Owing to the fact that the temperature of the motor is a function of its consumption, when more rough are the mechanical guides and the rubber guides of the electric window, greater will be the motor consumption for the operation of the glass. Under this circumstance, the temperature limit is variable. In this sense, there is established a median consumption of the motor in the rise of 5 A, allowing 20 cycles of raising and lowering without disconnection. for a median consumption of 15 A, are allowed 5 cycles of raising and lowering without disconnection (system compensated by the consumption). With a consumption between 5 A and 15 A, the number of raising and lowering cycles is directly proportional to the consumption, in the range of 5 to 20 cycles.

When the motor arrives to the upper stopper of the rise or when it is stopped because of the eventual blocking by an object, it is detained in a reduced time. The detention time is of 0.2 seconds, i.e., the motor is desactivated after 0.2 seconds of the arrival of the glass to the end of run stopper, either in manual or automatic mode. This forms a contrast with the disconnection time of the former art systems which do it in 0.5 seconds. This minimal disconnection time is possible in grace to the arrangement of an n poles motor. for instance eigth poles, which offer a disconnection time noticeably lower than with four poles motors as used conventionally in the systems known. It must be understood that when performing the function of soft stopping when the glas is lowering, the motor is disconnected before arriving to the lower stopper.

Another limit of operation of the motor of the operating means of the system object of the invention is the consumption, which is limited to a maximum of 25 A.

If, during the raising of the glass, the vehicle starts, the anti-pinching system of the invention detects and filters the start of the car motor by a tension fall. This provokes the detention of the motor and the subsequent stopping of the glass. In grace to this feature, the system permits avoiding the production of a false pinching, since the fall in tension provokes a variation of speed that can be detected by the Hall sensors installed, in such a way that, before producing a false pinching, will provoke the detention of the motor.

In the other hand, the anti-pinching system of the invention takes into account whether the vehicle is stopped or running as per the feeding tension. If the feeding tension is lower than 13 V, it indicates that the vehicle has not started, therefore the sensitivity may be higher. Instead, if the feeding tension is greater than 13 V that indicates that the vehicle has started, by which the sensitivity is lower. It must be taken into account that when the vehicle is running, what limits the sensitivity are the possible "bumps" and that the impact of the glass inertia may provoke a false pinching. In case of having a feeding lower than 13 V it is assumed that said voltage is the furnished by the battery. Normally, when the motor is running, the feeding is superior to the tension furnished by the battery, since in this way is possible loading it and feeding the remainder of the systems present in the vehicle.

The system of the invention is also characterized by the geometry of the whole. It is a modular system comprising three independent modules and which may be dismantled between them. Said modules are: motor module, reducer module and electronic module. Unlike the conventional systems, in which there exists a void between the shaft and the Hall sensors, the system object of the present invention incorporates a plastic wall of the housing situated between the shaft and the ssensors. Further, between the gears and the electric motor are situated watertight joints.

According to the invention, the motor is able of performing a reverseal in the turning sense very short (in the order of miliseconds) when the glass is lowering. This provokes the blocking of the motor in reverseal, such as it was in raising. More precisely, every time that the glass stops during the descent journey, there is produced a rise pulse. The maximum value of this puse is of 0.53 mm and produces a blocking in the motor gears as if it was of rise. In this way, the motor stopping does not have inertia and the glass does not "sink" so much when leaning on.

The conventional systems show a low performance due to the irreversibility of the system. Said irreversibility is provoked by the transmission mechanical unit formed by a gear and an endless screw. Said mechanical unit is used in order to avoid the glass going down when pushing it. It has been seen that when the gear motor shows an electro-mechanical performance over 20% the "irreversibility" becomes reduced. In this way, it is possible to increase the performance of the motor and, therefore, its median consumption. this has a positive influence in the energetic consumption of the vehicle.

The maximum journey of motor activation is limited in order to avoid a continuous movement in case of a mechanical breakdown. For that object, when connecting the motor, the number of pulses read by the Hall sensor is counted. If it surpasses a quantity without arriving to the stopper, the operation of the motor is disconnected. In this sense, it is estabilisehed a maximum journey of 100 mm over the journey reference value of the glass of the system for raising the glass.

Is the glass raisin system has not been initialized there exist no limit for the journey. The motor will be actuated when pressing the buttons for raising or lowering and will stop only under the following circumstances: stoppers' detection (the motor is deactivated at the 0.5 seconds of the arrival of the glass to the end of run stoppers, the soft stop excepted), temperature limit by software, temperature limit of the motor by termo-mechanics.

If during the start of the vehicle the glass of the window is raising, this change of the motor state, from stopped to started, which also originates a change on the feeding tension in the electric circuit of the car, must not producing a trapping cycle. In order to solve that contingency there is established that the electronic circuit detects the feeding tension in the electric circuit of the car. The detection of a sudden change of the feeding tension during the raising cycle of the electric window produces a manoeuvre of stoppage of the glass movement. After a new pressing of the button, the electric window should raise again.

The condition of the vehicle running and vehicle stopped has direct repercussions on the opertion of the trapping cycle. The insensitivity level of the indirect trapping system is determined mainly by its resistance to the inertia moment produced by the rolling conditions when the car is running. The trapping system may be more sensitive as far as the vehicle is not running and, therefore, not subject to the irregularities of the rolling. Therefore, it is determined whether the car is running or stopped in the basis of the measure of the feeding tension. In this sense, it is estabilished that the motor is stopped if a feeding lower than 13 V is detected. It will be estabilished that the motor is running when a feeding higher than 13 V is detected. In this way the trapping sensitivity level is automatically calibrated.

If the motor has not started, the trapping sensitivity is high and the risk of an accident because of the manipulation of the electric window, specially by children, is limited. If the motor is running, the presence of a driver is supposed and the trapping sensitivity will be lower for filtering the inertia moments produced by the unevenness of the rolling.

In front of an eventual defect of functioning of the position detection of the glass, read by the Hall effect sensors, it is kept a safety criterion in the basis of the following circumstances. If the Hall effect sensors don't detect the turning of the motor but it is really moving, the electronics detect that during 0.2 seconds does not exist a lecture of the pulses of the Hall sensors and inactivates the electric window motor. This permits raising or lowering the glass in a sensitive way, by pressing the manual button for raising or lowering. Every rise o descent pulse will permit a glass journey equivalent to 0.2 seconds of the motor turning time. If the Hall effect sensors continue counting pulses in spite of having achieved the journey limit of the electric window and, therefore, the motor continues active creating pressure of the glass against the stopper, the motor current sensors function when detecting a consumption superior to 26 A, disconnecting the motor. It is established a physic limit for the motor of 20 A/s.

The mechanical effects produced because of the mechanical deformation of the transmisssion or elasticity of the system are compensated in grace to the improvements of the anti-pinching system of the invention. Such deformations create always an incremental value by virtue of the fact that it is a plastic deformation, which is always incremental, since, in the reverse case, there should be elastic deformations which don't correspond to the object of the system of the invention. At every cycle of stopper of the glass, the EEPROM memory stores the new value "actualized journey of the glass because of mechanical derivations". With this calculation it's also actualized the value of the journey of the upper frame and the value of the journey for the soft stop.

As a function of the feeding tension there is estabilished an auto-calibration of the trapping sensitivity. Thus, at a bigger speed of the electric window, the inertial displacement at the stoppage is greater and therefore, the trapping force is also greater. It must be taken into accountthe fact that the state of the rubbers and guides of the glass of the electric window as well as the climatic conditions condition the movement speed of the glass.

The calculus algorithm estabilishes also a trapping sensitivity auto-calibration as a function of the speed of the electric window, in this way there is achieved a lineal trapping sensitivity independently of the electric window speed, either by tension differences in the feeding circuit or by the friction of the transmission. the reaction to the trapping detection is higher when higher is the speed, achieving a similar trapping pressure sensitivity at different speeds.

At the EEPROM memory are stored data such as, for instance, the original reference journey of the electric window, the actual journey of the glass, the reference measure of the upper frame, the reference measure for the soft stop function, the measure for the window of qualification of the trapping (standard between 4 and 200 mm of the upper position), the trapping detection thresholds, the manufacturer, the fabrication lot (value up to 1.000.000), the date (month-year format), the software version, the device version, the EEPROM version, the counter of hudreds, the movements of the electric window performed (value up to 1.000.000), the units counter (trapping cycles performed, value up to 65.000). There may be stored also a register of pinchings, as well as the deceleration produced (for a later report). Thus, the variables stored at said memory are the mechanical effects, the journey and detection threshold, the soft stop of the glass, etc.

According to an aspect of the invention and as has been discussed above, the system is activated whilst the glass is rising and at a distance between 4 and 200 mm of the upper position. If an obstacle is detected, the glass will descend a distance higher or equal to 125 mm. During 10 secondsa, the raising mechanism is inactivated and that of the descent continues active. Said 10 seconds are reinitialized with every movement of rise or descent and stoppage.

The electronic circuit design permits arranging the application in a microcontroller with the possibility of the application programming in the PCB itself once the components are assembled. In this way it is possible programming the application at the same components assembly line, flexibilizing programs actualization, and possibiliting application software actualizations at the final assembly line, retailers, post-sales, etc. as well as an agile access to the software and EEPROM data. In both cases, the EEPROM memory is programmable being possible the configuration of the application varying only the parameters stored at the EEPROM memory.

Th electronic plate of the system is a 4 layers plate and has an easy access dismantling the housing cover without dismantling neither the electric window nor the motor. This allows an easy substitution of the electronic plate.

The invention foresees as well the possible modification of the control software giving to the microprocessor the management capacity of said management. In the other hand, it is also foreseen that the opening of the door may be performed by remote control.

The initialization of the motor is produced performing a cycle of rise and descent for recognizing the door and the windows journey. From that moment, the electronic functions start working. Previously to said initialization, the motor works as a conventional electric motor.

The features and advantages of the improvements of the anti-pinching systems for the automobile that are the object of the present invention will be evident from the detailoed description of a preferred incorporation of same that will be given, from now on, as a non limitative example, with reference to the accompanying drawings, in which:

FIG. 1 is an schematic view of a diagram in which can be appreciated the elements that constitute the anti-pinching system provided with the improvements of the present invention.

FIG. 2 illustrates schematically the global arrangement of the mechanical elements of an electric window provided with an improved anti-pinching system according to the invention.

FIG. 3 is an elevation schematic view of the motor module of the system of the invention.

FIG. 4 is a plant view of the lower portion of the control means of the system of the invention in which has been schematically shown some of the elements constituting the electronics associated with the motor module.

And FIG. 5 is a schematic view of the connector of the motor module seen by the female portion and in which are ilustrated in detail the outer connections of the system.

The elements described in the Figures correspond to (1) control means, (2) motor module, (2a) magneto of the motor shaft, (3) motor, (4) MOSFET, (5) relay, (6) microprocessor, (7) consumption signal, (8) tension signal (9, 10) Hall sensors, (11) glass, (12) electric window, (13) operating cable, (14) drum, (15) tension regulator, (16) connector, (17) body contact, (18) battery contact, (19) connection button for operating the driver's glass mounted at the driver's side, (20) connection button for operating the passenger's glass mounted at the driver's side, (21) connection centralized opening, (22) connection automatic mode, (23) output for the operation of the sliding roof, (24) connection for the centralized shutting, (25) output for the shutting of the sliding roof, (26) connection to the contact key of the motor, (27) connection for door opening.

The anti-pinching system of the invention as shown in FIG. 1 comprises control means (1) of the operation of the motor module (2) which operates the glass (11) of an automobile, see FIG. 2. As discussed above, the control means (1) are activated when same detect any variation in the normal operation of the system.

The improvements of the invention have an effect on the motor module (2), which is comprised, in the incorporation of the example of FIG. 1, by a motor (3) of 8 poles. It is a high performance and low heating motor which shows incorporated the magneto in the shaft. With particular reference to the FIG. 3 of the drawings, the arrangement of the magneto of the motor (2a) in the shaft combined with the geometry of the electronic circuit housing allows the integration of Hall effect sensors (9, 10) in the lower face of the electronic circuit. In this way there is achieved a simplification of the assembly process and the reading quality of the magnetic field is very good in the temperature range from −40° C. up to +85° C.

The motor module (2) receives the signals of the control means (1), which comprise a field effect transistor of insulated door (MOSFET) represented by (4) in FIG. 1 and provided for compensating the intensity peaks, the feeding variations and estabilishing a relay (5) and other elements such as condensers provided in a multi-layer plate, a programmable EEPROM memory, etc. The semi-conductor MOSFET switches in void the power relay which connects the motor, in such a way that the useful life of the relay is advantageously longer. When switching in void the relay, the contacts don't open and close under load and in this way are substantially avoided the problems derived of the electromagnetic emmissions.

The control means (1) receive the processed signals coming from the programmable microprocessor (6) which is mounted in the portion more remote of the feeding lines and of the electric motor (3) for avoiding, in grace to its design, any possible disturbance. Said means incorporate, further, a four layers plate (not illustrated) which shows an easy acces removing the cover of the housing without dismantling neither the electric window nor the motor. This allows an easy substitution of the electonic plate. all the electronics is integrated in the motor assembly of the electric window using a connection by means of the box with a 12 channel connector like the shown in FIG. 5.

The microprocessor (6), in turn, receives signals (7, 8) on the consumption and tension information as input lectures.

The micro-controller used in the incorporation disclosed is provided with a "Flash" memory of 4 kb which allows performing the programming of the application directly on the micro-controller through an SPI series interface or by means of a conventional non-volatile memory programmer. In this way, it's possible to update the application at the assembly and programming process itself. All the instructions are performed in a cycle of the processor's clock, permitting to the designer of the application optimize the consumption on the basis of the data processing speed.

Thus, the control means (1) operate over the motor module (2) as a function of the turning speed of the motor (2) detected by Hall sensors of the type at 0° (9, 10), which permit to regulate the motor (3) speed emmiting a number of pulses for every turn, or as a function of the circulating current intensity, or the system consumption, stopping the motor (3) and/or reversing the turning sense.

The elements defining the control means (1) may be appreciated at FIG. 4, in which can be seen the lower portion of the circuit with the Hall sensors (9, 10), the microprocessor (6), a tension regulator (15), the relay (5), the MOSFET (4) and the connector (16).

With reference to FIG. 5, the connector (16) includes a plurality of connection elements, which are described in the attached Table.

| CONNECTION ELEMENT | DESCRIPTION | TENSION (V) | | |
|---|---|---|---|---|
| | | 0-1 | 1-9 | 9-12 |
| (17) | Body | Always 0V | | |
| (18) | Battery | Always 12V | | |
| (19) | Button of driver's glass at the driver's door | descent | — | rise |
| (20) | Button of passenger's glass at the driver's door | descent | — | rise |
| (21) | Central opening | — | — | active |
| (22) | Automatic | — | — | active |
| (23) | Output for the operation of the sliding roof | — | — | active |
| (24) | Contralized shutting (general) | — | — | Active |
| (25) | Shutting the sliding roof (output) | Active | — | — |
| (26) | Motor contact key | — | — | Active |
| (27) | Door opening | Active | — | — |

The arrangement of an eight pole motor such as the one of the preferred incorporation here disclosed offers a great precision when allowing a lectures resolution every 0.5 mm of glass vertical displacement. In other words, corresponding every turn of the motor shaft to 4 pulses of the sensor.

The control means (1) are furnished with a plate that substantially reduces the consumption of the system of the invention, specially every time that the relay (5) is activated, cutting the current's peaks. Furthermore, said control means (1) incorporate control means of the temperature of the system starting from the number of turns of the motor (3) shaft during a given time taking into account the consumption, in such a way that when surpassing an estabilished value, said control of the system temperature only permits the rise of the window. There are also available regulation means of the maximum journey of the window that, when connecting the motor (3), count the number of pulses read by the Hall sensor (9, 10), disconnecting the motor (3) when a certain estabilished value is overreached without the window arriving to the stopper. Means (not shown) are available for disconnecting the motor (3) when the window is at a safety distance before the end of the run stopper in its descent, in such a way that the remainder of the journey is obtained because of the window's inertia, allowing a soft stop as a function of the feeding tension, the descent speed of the glass and the system's consumption. In order to that, the motor (3) is disconnected, first with the MOSFET (4) and then with the relay (5), and stops at a safety distance before the lower stoppage.

As above disclosed, the control means (1) include an programmable EEPROM memory of 128 bytes which may be configurated varying only the stored parameters, said memory stores data such as the original reference journey and the actual journey of the glass, the reference measure of the upper frame, the reference measure for the soft stop function, the movements of the electric window made, a register of pinchings, the deceleration produced, etc.

More precisely, at the EEPROM memory of the incorporation described are stored the parameters of the application. Said parameters may be modified without the need of intervening in the aplication software. The foreseen parameters are the following:

1—Number of data at the EEPROM memory.
2—Original reference journey of the glass of the electric window.
3—Upper position of the trapping window. If the position is lesser, there is not trapping made.
4—Lower position of the trapping window. If the position is greater, the trapping is not performed.
5—Position for soft stop when lowering.
6—Position for soft stop when raising.
7—Trapping detection value at maximum speed.
8—Trapping detection value at intermediate speeds.
9—Trapping detection value at minimum speed.
10—Pressing time at stopper (in units of 0.131072 s).
11—Manufacturer.
12—Manufacturing lot (value up to 1.0000.000)
13—Date (MonthMonth-YearYear format).
14—Software version.
15—Hardware version.
16—EEPROM version.
17—Hundreds counter. Electric window movements (up to 1.000.000).
18—Units counter. Trapping cycles performed (value up to 65.000).

With reference to FIG. 2, the protection against the overcharging of the motor of the system for raising a window (11) is performed by software, which accumulates the time of functioning of the electric window and, when exceeding the limit estabilished value only permits the raising up to the upper stopper. In normal operating condictions should be performed 20 complete cycles of rise and descent of the glass (11) without disconnection of the system.

If the glass (11) arrives to the upper stopper of the journey or is stopped by the eventual blocking of an object, the motor (3) stops in a very short time, for instance in 0.2 s, in grace to the fact that this motor (3) is of eight poles.

If the vehicle is starting during the rise of the glass (11) the anti-pinching system of the invention detects and filters the fall of tension provoked by the starting of the motor avoiding that a falsse pinching is produced, since the fall in tension provokes a variation on the speed that can be detected by the Hall sensors (9, 10), in such a way that, before producing a false pinching, will provoke the detention of the motor (3).

In this sense, the anti-piinching system takes into account whether the vehicle is stopped or running as per the feeding tension. if the feeding tension is lower than 13 V it indicates that the vehicle has not started, because of which the sensitivity may be higher. Instead, if the feeding tension is higher that 13 V, it indicates that the vehicle has been started, by which the sensitivity is lower.

The motor (3) is able to perform a reverseal in the turning sense in a very short time when the glass (11) is lowering. Thus, every time that the glass (11) stops during its descent journey, there is produced a rise pulse. The maximum value of this pulse is of 0.53 mm and produces a blocking on the motor (3) gears like if it was a rise, in such a way that the detention of the motor lacks inertia and the glass does not "sink" so much when leaning on.

When the motor (3) is connected, the number of pulses read by the Hall sensor (9, 10) is counted. If it surpasses an amount without having reached the stopper (maximum journey 100 mm), the motor (3) is diconnected. If there exists an operation defect in the detection of the position of the glass (11), which is read by the Hall effect sensors (9, 10), a security criteria is kept on the basis of several circumstances. If the Hall effect sensors (9, 10) don't detect the turning of the motor (3), but it is really moving, the control means (1) tells that during 0.2 s there is not pulses reading of said Hall sensors (9, 10) and inactives the movement of the motor (3) of the electric window (12). This permits raising or lowering the glass (11) by the operating cable (13) and the drum (14) in a sensitive way pulsating the rise or descent button, in such a way that every rise or descent pushing will permit a journey of the glass (11) equivalent to 0.2 s of rotation time of the motor (3). If the Hall effect sensors (9, 10) continue counting pulses even if the journey of the glass (11) limit has been reached and, therefore, the motor (3) continues functioning in such a way that the glass raises against the stopper, the control means (1) detects a consumption over 25 A and disconnects the motor. The physical limit estabilished for the motor is 20 A/s.

Another remarkable feature is the fact that the system of the invention permits solving eventual incompatibilities between the orders of the buttons. Thus, at an order of raising and another of lowering, the electronics gives priority to the descent sequence taking into account that if the glass is raising and the descent button is pulsed, the glass descents. In the other hand, if the glass is lowering and the rise button is pulsed, the glass will stop. Nevertheless, it's also foreseen that the glass stops when starting or stopping the car motor with the contact key.

Even if a preferred incorporation of one of the improvements on the anti-pinching systems for the automobile has been described, the inventive scope of the present invention foresees that incorporation of other improvements, especially those derived of the programmability of all the parameters intervening in the system object of the invention.

Enough described in what the present invention consists corresponding with the attached drawings, it's understood that in same may be introduced any detail modification deemed convenient, provided that there are not altered the essential characteristics of the invention summarized in the following claims.

What is claimed is:

1. An anti-pinching system for a motor-operated closure panel comprising:
   a motor having at least eight poles;
   a drive mechanism for the panel operated by the motor; and
   a controller,
      the controller including a pair of Hall effect sensors aligned in a back-to-back relation, which provide output pulses representative of the operation of the motor,
      the controller being responsive to the Hall effect sensor output pulses to control the speed and direction of the motor.

2. An anti-pinching system according to claim 1, wherein the motor is operated by a relay controlled by a MOSFET.

3. An anti-pinching system according to claim 1, wherein the controller further includes an EEPROM programmable memory, and a microprocessor,
   the EEPROM being operative in conjunction with the microprocessor to store information representative of the maximum permitted travel path for the panel, and to update the maximum permitted travel path information after each complete traverse of the travel path, thereby to compensate for the effects of mechanical deformation on the maximum permitted travel of the panel,
   the controller being responsive to the Hall effect sensor output pulses and information stored in the EEPROM to control the speed and direction of the motor.

4. An anti-pinching system according to claim 1, wherein:
   the controller is operative to deenergize the motor when the panel reaches a predetermined distance from its maximum permitted travel in the closing direction; and
   the panel thereafter continues to a fully closed position by virtue of a spring mechanism connected to the drive mechanism.

5. An anti-pinching system according to claim 1, wherein:
   the controller is operative to de-energize the motor when the panel reaches approximately a predetermined distance from its maximum permitted travel in the opening direction,
   the actual distance at which the motor is de-energized is determined according to one or more or of the linear speed of the panel as it approaches the predetermined distance, the operating state of the motor, and the current flow; and
   the panel thereafter continues to a fully open position by virtue of inertia.

6. An anti-pinching system according to claim 1, wherein the controller is operative to count the number of pulses produced by the Hall effect sensors from a time at which the motor is energized, and to de-energize the motor when a predetermined number of pulses have been counted and the panel has not reached a predetermined stopping position.

7. An anti-pinching system for a motor-operated closure panel comprising:
   a motor having at least eight poles;
   a drive mechanism for the panel operated by the motor; and
   a controller, the controller being comprised of:
      a pair of Hall effect sensors which provide output pulses representative of the operation of the motor;
      an insulated gate field effect transistor;
      a relay;
      a programmable microprocessor;
      a plurality of capacitors formed on a multi-layer plate; and
      an EEPROM programmable memory, the EEPROM being operative in conjunction with the microprocessor to store information representative of the maximum permitted travel path for the panel, and to update the maximum permitted travel path information after each complete traverse of the travel path, thereby to compensate for the effects of mechanical deformation on the maximum permitted travel of the panel,
      the controller being responsive to the Hall effect sensor output pulses and information stored in the EEPROM to control the speed and direction of the motor.

8. An anti-pinching system according to claim 7, wherein the controller further includes a mask for programming the controller after assembly.

9. An anti-pinching system for a motor-operated closure panel comprising:
   a motor having at least eight poles;
   a drive mechanism for the panel operated by the motor; and
   a controller,
      the controller including a pair of Hall effect sensors which provide output pulses representative of the operation of the motor,
      the controller being responsive to the Hall effect sensor output pulses to control the speed and direction of the motor,
      the controller being operative to de-energize the motor when the panel reaches a predetermined distance from its maximum permitted travel in the closing direction, the panel thereafter continuing to a position of full closure by virtue of a spring mechanism connected to the drive mechanism.

10. An anti-pinching system according to claim 9, wherein the operation of the spring mechanism is variable as a function of the motor drive voltage.

11. An anti-pinching system for a motor-operated closure panel comprising:
   a motor having at least eight poles;
   a drive mechanism for the panel operated by the motor; and
   a controller,
      the controller including a pair of Hall effect sensors which provide output pulses representative of the operation of the motor,
      the controller being operative to control de-energizing of the motor according to the current flow over a range of ±13 volts,
      the controller being responsive to the Hall effect sensor output pulses to control the speed and direction of the motor,
      the controller being operative to de-energize the motor when the panel reaches a predetermined distance from its maximum permitted travel in the closing direction, the panel thereafter continuing to a position of full closure by virtue of a spring mechanism connected to the drive mechanism.

* * * * *